United States Patent
Sarkis et al.

(10) Patent No.: US 12,068,857 B2
(45) Date of Patent: Aug. 20, 2024

(54) MULTI-TRANSMISSION NEGATIVE ACKNOWLEDGEMENT INDICATION IN PHYSICAL SIDELINK FEEDBACK CHANNEL

(71) Applicant: QUALCOMM Incorporated, San Diego, CA (US)

(72) Inventors: Gabi Sarkis, San Diego, CA (US); Tien Viet Nguyen, Bridgewater, NJ (US); Kapil Gulati, Hillsborough, NJ (US); Sudhir Kumar Baghel, Hillsborough, NJ (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 953 days.

(21) Appl. No.: 16/940,540

(22) Filed: Jul. 28, 2020

(65) Prior Publication Data

US 2022/0038213 A1 Feb. 3, 2022

(51) Int. Cl.
*H04W 72/12* (2023.01)
*H04L 1/1812* (2023.01)
(Continued)

(52) U.S. Cl.
CPC ............ *H04L 1/1812* (2013.01); *H04W 4/40* (2018.02); *H04W 72/04* (2013.01); *H04W 72/20* (2023.01)

(58) Field of Classification Search
None
See application file for complete search history.

(56) References Cited

U.S. PATENT DOCUMENTS

2017/0325277 A1* 11/2017 Fujishiro ................. H04W 4/06
2017/0347394 A1* 11/2017 Yasukawa ............. H04W 28/04
(Continued)

FOREIGN PATENT DOCUMENTS

WO 2019019184 A1 1/2019
WO WO-2019019184 A1 * 1/2019 ........... H04L 1/0073

OTHER PUBLICATIONS

International Search Report and Written Opinion—PCT/US2021/042027—ISA/EPO—Oct. 21, 2021.

*Primary Examiner* — Alex Skripnikov
*Assistant Examiner* — Pamit Kaur
(74) *Attorney, Agent, or Firm* — Muncy, Geissler, Olds & Low, P.C.

(57) ABSTRACT

Disclosed are techniques related to performing wireless sidelink communication. Originating (e.g., transmitting) and target (e.g., receiving) apparatuses may operate in a NACK-only mode. In this mode, the target apparatus only provides NACK feedbacks to transmissions that it did not receive. Lack of NACK feedback is interpreted by the originating apparatus that the transmissions were successfully received. However, the target apparatus maybe incapable of transmitting NACK for each of missed transmission. In NACK-only mode, the originating would not retransmit these missed transmissions. To address this issue, the target apparatus can transmit a multi-transmission NACK feedback to indicate that multiple transmissions were not successfully received. The multi-transmission NACK is a single feedback, and thus can enable a target apparatus with limited feedback capacity to indicate NACK for multiple transmissions.

30 Claims, 8 Drawing Sheets

(51) Int. Cl.
*H04W 4/40* (2018.01)
*H04W 72/04* (2023.01)
*H04W 72/20* (2023.01)

(56) References Cited

U.S. PATENT DOCUMENTS

2020/0220669 A1 7/2020 Park
2021/0167926 A1* 6/2021 Lin .................. H04W 76/14
2022/0159691 A1* 5/2022 Chen ................ H04L 1/1812

* cited by examiner

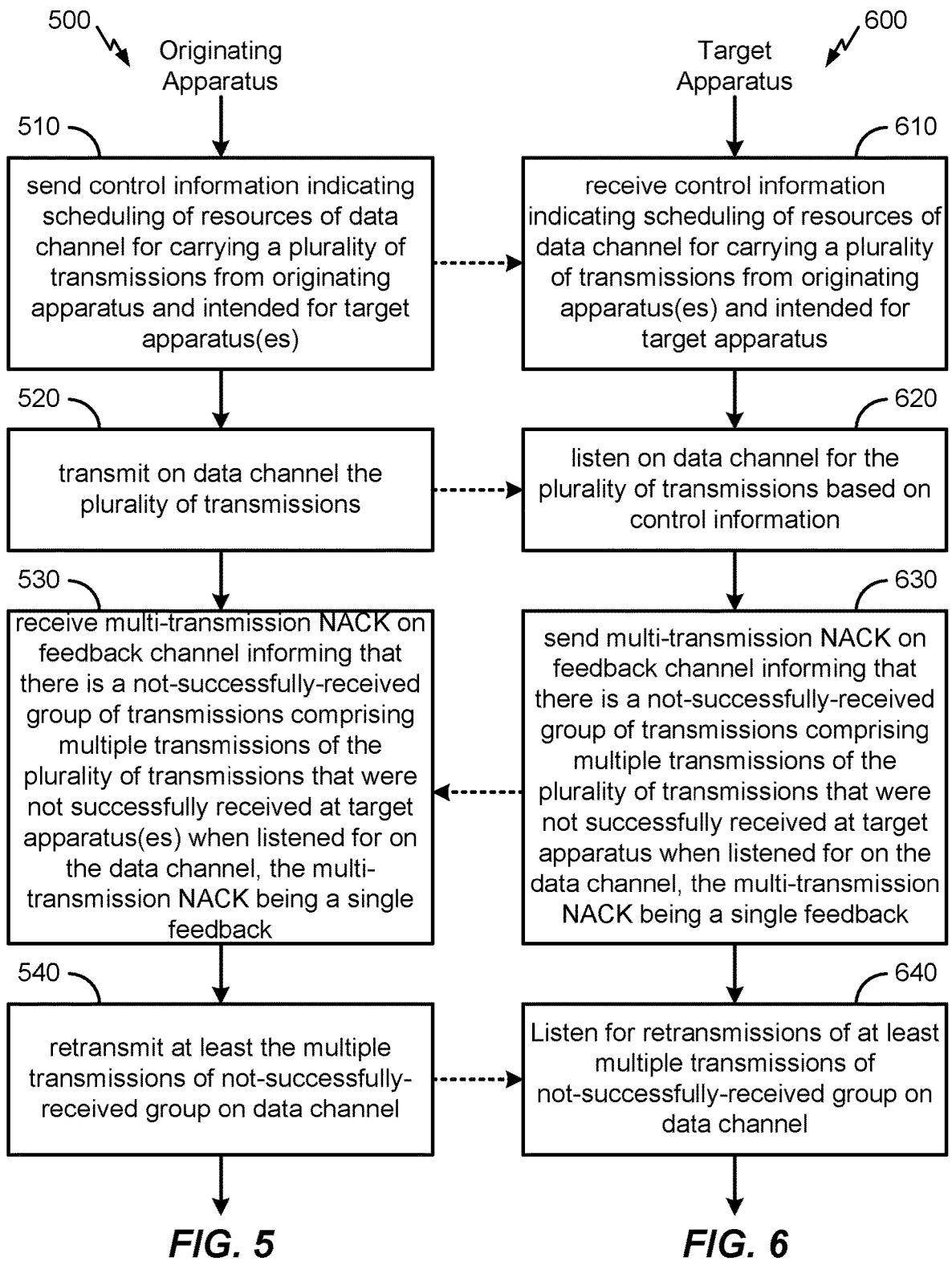

MULTI-TRANSMISSION NEGATIVE ACKNOWLEDGEMENT INDICATION IN PHYSICAL SIDELINK FEEDBACK CHANNEL

TECHNICAL FIELD

Various aspects described herein generally relate to wireless communication systems, and more particularly, to multiple negative acknowledgement (NACK) indication in physical sidelink feedback channel (PSFCH).

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" (NR)), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

One or more aspects may be directed to a target apparatus. The target apparatus may comprise a transceiver, a memory, and a processor communicatively coupled to the transceiver and the memory. The processor, the memory, and/or the transceiver may be configured to receive control information from one or more originating apparatuses. The control information may indicate scheduling of resources of a data channel for carrying a plurality of transmissions from the one or more originating apparatuses and intended for the target apparatus. The processor, the memory, and/or the transceiver may also be configured to listen on the data channel for the plurality of transmissions based on the control information. The processor, the memory, and/or the transceiver may further be configured to send a multi-transmission negative acknowledgment (NACK) to the one or more originating apparatuses on a feedback channel. The multi-transmission NACK may inform the one or more originating apparatuses that there is a not-successfully-received group of transmissions. The not-successfully-received group may comprise multiple transmissions of the plurality of transmissions that were not successfully received at the target apparatus when listened for on the data channel. The multi-transmission NACK may be a single feedback.

One or more aspects may be directed to a method of a target apparatus. The method may comprise receiving control information from one or more originating apparatuses. The control information may indicate scheduling of resources of a data channel for carrying a plurality of transmissions from the one or more originating apparatuses and intended for the target apparatus. The method may also comprise listening on the data channel for the plurality of transmissions based on the control information. The method may further comprise sending a multi-transmission negative acknowledgment (NACK) to the one or more originating apparatuses on a feedback channel. The multi-transmission NACK may inform the one or more originating apparatuses that there is a not-successfully-received group of transmissions. The not-successfully-received group may comprise multiple transmissions of the plurality of transmissions that were not successfully received at the target apparatus when listened for on the data channel. The multi-transmission NACK may be a single feedback.

One or more aspects may also be directed to a target apparatus. The target apparatus may comprise means for receiving control information from one or more originating apparatuses. The control information may indicate scheduling of resources of a data channel for carrying a plurality of transmissions from the one or more originating apparatuses and intended for the target apparatus. The target apparatus may also comprise means for listening on the data channel for the plurality of transmissions based on the control information. The target apparatus may further comprise means for sending a multi-transmission negative acknowledgment (NACK) to the one or more originating apparatuses on a feedback channel. The multi-transmission NACK may inform the one or more originating apparatuses that there is a not-successfully-received group of transmissions. The not-successfully-received group may comprise multiple transmissions of the plurality of transmissions that were not successfully received at the target apparatus when listened for on the data channel. The multi-transmission NACK may be a single feedback.

One or more aspects may be directed a non-transitory computer-readable medium storing computer-executable instructions for a target apparatus. The computer-executable instructions may comprise one or more instructions causing the target apparatus to receive control information from one or more originating apparatuses. The control information may indicate scheduling of resources of a data channel for carrying a plurality of transmissions from the one or more originating apparatuses and intended for the target apparatus. The computer-executable instructions may also comprise one or more instructions causing the target apparatus to listen on the data channel for the plurality of transmissions based on the control information. The computer-executable instructions may further comprise one or more instructions causing the target apparatus to send a multi-transmission negative acknowledgment (NACK) to the one or more originating apparatuses on a feedback channel. The multi-transmission NACK may inform the one or more originating apparatuses that there is a not-successfully-received group of transmissions. The not-successfully-received group may comprise multiple transmissions of the plurality of transmissions that were not successfully received at the target apparatus when listened for on the data channel. The multi-transmission NACK may be a single feedback.

One or more aspects may be directed to an originating apparatus. The originating apparatus may comprise a transceiver, a memory, and a processor communicatively coupled to the transceiver and the memory. The processor, the memory, and/or the transceiver may be configured to send control information to a target apparatus. The control information may indicate scheduling of resources of a data channel for carrying a plurality of transmissions from the originating apparatus and intended for the target apparatus. The processor, the memory, and/or the transceiver may also be configured to transmit on the data channel the plurality of transmissions. The processor, the memory, and/or the transceiver may further be configured to receive a multi-transmission negative acknowledgment (NACK) from the target apparatus on a feedback channel. The multi-transmission NACK may inform the originating apparatus that there is a not-successfully-received group of transmissions. The not-successfully-received group may comprise multiple transmissions of the plurality of transmissions that were not successfully received at the target apparatus when listened for on the data channel. The multi-transmission NACK may be a single feedback. The processor, the memory, and/or the transceiver may yet further be configured to retransmit at least the multiple transmissions of the group of unreceived transmissions on the data channel when the multi-transmission NACK is received.

One or more aspects may be directed to a method of an originating apparatus. The method may comprise sending control information to a target apparatus. The control information may indicate scheduling of resources of a data channel for carrying a plurality of transmissions from the originating apparatus and intended for the target apparatus. The method may also comprise transmitting on the data channel the plurality of transmissions. The method may further comprise receiving a multi-transmission negative acknowledgment (NACK) from the target apparatus on a feedback channel. The multi-transmission NACK may inform the originating apparatus that there is a not-successfully-received group of transmissions. The not-successfully-received group may comprise multiple transmissions of the plurality of transmissions that were not successfully received at the target apparatus when listened for on the data channel. The multi-transmission NACK may be a single feedback. The method may yet further comprise retransmitting at least the multiple transmissions of the group of unreceived transmissions on the data channel when the multi-transmission NACK is received.

One or more aspects may also be directed to an originating apparatus. The originating apparatus may comprise means for sending control information to a target apparatus. The control information may indicate scheduling of resources of a data channel for carrying a plurality of transmissions from the originating apparatus and intended for the target apparatus. The originating apparatus may also comprise means for transmitting on the data channel the plurality of transmissions. The originating apparatus may further comprise means for receiving a multi-transmission negative acknowledgment (NACK) from the target apparatus on a feedback channel. The multi-transmission NACK may inform the originating apparatus that there is a not-successfully-received group of transmissions. The not-successfully-received group may comprise multiple transmissions of the plurality of transmissions that were not successfully received at the target apparatus when listened for on the data channel. The multi-transmission NACK may be a single feedback. The originating apparatus may yet further comprise means for retransmitting at least the multiple transmissions of the group of unreceived transmissions on the data channel when the multi-transmission NACK is received.

One or more aspects may be directed a non-transitory computer-readable medium storing computer-executable instructions for an originating apparatus. The computer-executable instructions may comprise one or more instructions causing the originating apparatus to send control information to a target apparatus. The control information may indicate scheduling of resources of a data channel for carrying a plurality of transmissions from the originating apparatus and intended for the target apparatus. The computer-executable instructions may also comprise one or more instructions causing the originating apparatus to transmit on the data channel the plurality of transmissions. The computer-executable instructions may further comprise one or more instructions causing the originating apparatus to receive a multi-transmission negative acknowledgment (NACK) from the target apparatus on a feedback channel. The multi-transmission NACK may inform the originating apparatus that there is a not-successfully-received group of transmissions. The not-successfully-received group may comprise multiple transmissions of the plurality of transmissions that were not successfully received at the target apparatus when listened for on the data channel. The multi-transmission NACK may be a single feedback. The computer-executable instructions may yet further comprise one or more instructions causing the originating apparatus to retransmit at least the multiple transmissions of the group of unreceived transmissions on the data channel when the multi-transmission NACK is received.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which:

FIGS. 5-6 illustrate example flow charts of methods and/or processes performed by originating and target apparatus to conduct sidelink communications, according to one or more aspects.

DETAILED DESCRIPTION

Figure 1:
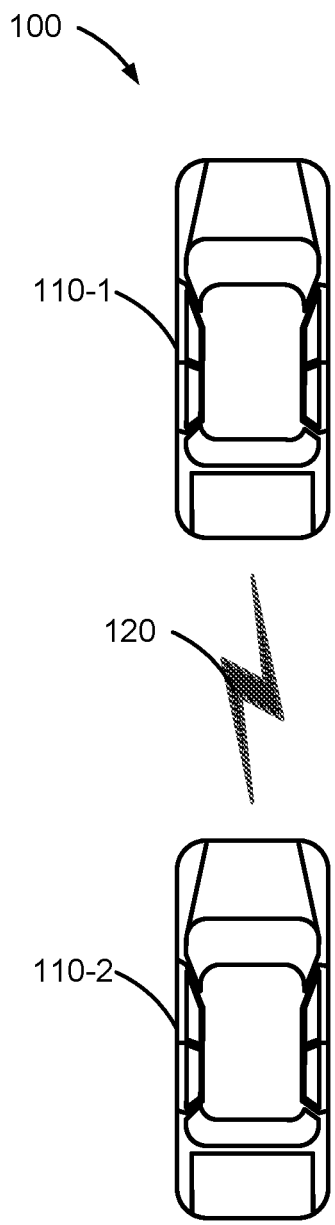
FIG. 1 illustrates an example of a vehicle-to-vehicle (V2V) scenario.

Various aspects described herein generally relate to wireless communication systems, and more particularly, to multiple NACK indication in PSFCH. These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference signals the UE is measuring.

New Radio (NR) allows a network independent communication between two UEs. In other words, instead of communicating through a base station serving as an intermediary, two UE can perform sidelink communication with each other through a direct PC5 interface, also referred to as sidelink (SL) communication. Sidelink communications can arise in cellular vehicle-to-everything (C-V2X) context. An example is a vehicle-to-vehicle (V2V) scenario 100 illustrated in FIG. 1. Here, the two vehicles 110-1, 110-2 may be viewed as UEs conducting sidelink communication with each other. Each vehicle 110-1, 110-2 may transmit to and receive data from the other vehicle 110-1, 110-2 over a wireless link 120. For ease of reference, transmit and receive UEs may also be referred to as "originating" and "target" UEs. In FIG. 1, the vehicle 110-1 may be the originating UE and the vehicle 110-2 may be the target UE in one moment. At another moment, the roles may be reversed.

Following channels enable sidelink communications to take place between one or more transmit UEs and one or more receive UEs: physical sidelink control channel (PSCCH), physical sidelink feedback channel (PSFCH), and physical sidelink shared channel (PSSCH). When there is traffic to be sent, an originating UE may transmit on the PSCCH to send control information and/or signals to prepare a target UE to receive traffic from the originating UE. For example, the PSCCH may indicate or otherwise notify the UE of time-frequency resources (e.g., PSSCH resources) reserved for data transmission. The originating UE may also include a part of sidelink control information (SCI), demodulation reference signal (DMRS) patterns, and so on to allow the target UE to properly adjust to channel conditions. The originating UE may then transmit data to the target UE on the PSSCH, e.g., on the reserved PSSCH resources. The PSSCH may be utilized to carry other information such as another part of SCI, system information block (SIB), and so on.

NR sidelink supports HARQ-ACK reporting for PSSCH transmissions. In NR, the sidelink feedback is limited to transport block (TB)-level ACK/NACK. The target UE may use the PSFCH to provide feedback to the originating UE. For example, the PSFCH may carry a HARQ-ACK/NACK feedback indicating whether the target UE properly received the transmission from the originating UE.

In Release 16 (Rel-16) of Third Generation Partnership Project (3GPP) standards, two sidelink feedback modes are supported: ACK/NACK feedback and NACK-only feedback. In the ACK/NACK feedback mode, the target UE transmits ACK or NACK feedback to the originating UE depending on whether or not the transmission from the originating UE was successfully received at the target UE. In the NACK-only feedback mode, the target UE only transmits NACK if the reception was not successful; No ACK feedback is transmitted if the reception was successful. In the NACK-only feedback mode, the originating UE infers ACK if it does not receive any feedback from the target UE. In either mode, upon receiving the NACK feedback on the PSFCH, the originating UE can retransmit the traffic that was not successfully received.

As an aside, there can be circumstances in which the originating UE transmits data, but the target UE does not detect the transmission, and thus is unaware of it being the target of the transmitted data. In such circumstances, the target UE would not provide any feedback to the originating UE, which would be inferred as ACK by the originating UE in the NACK-only mode. As a mitigation measure, the originating UE may be configured to transmit the data multiple times.

Figure 2:
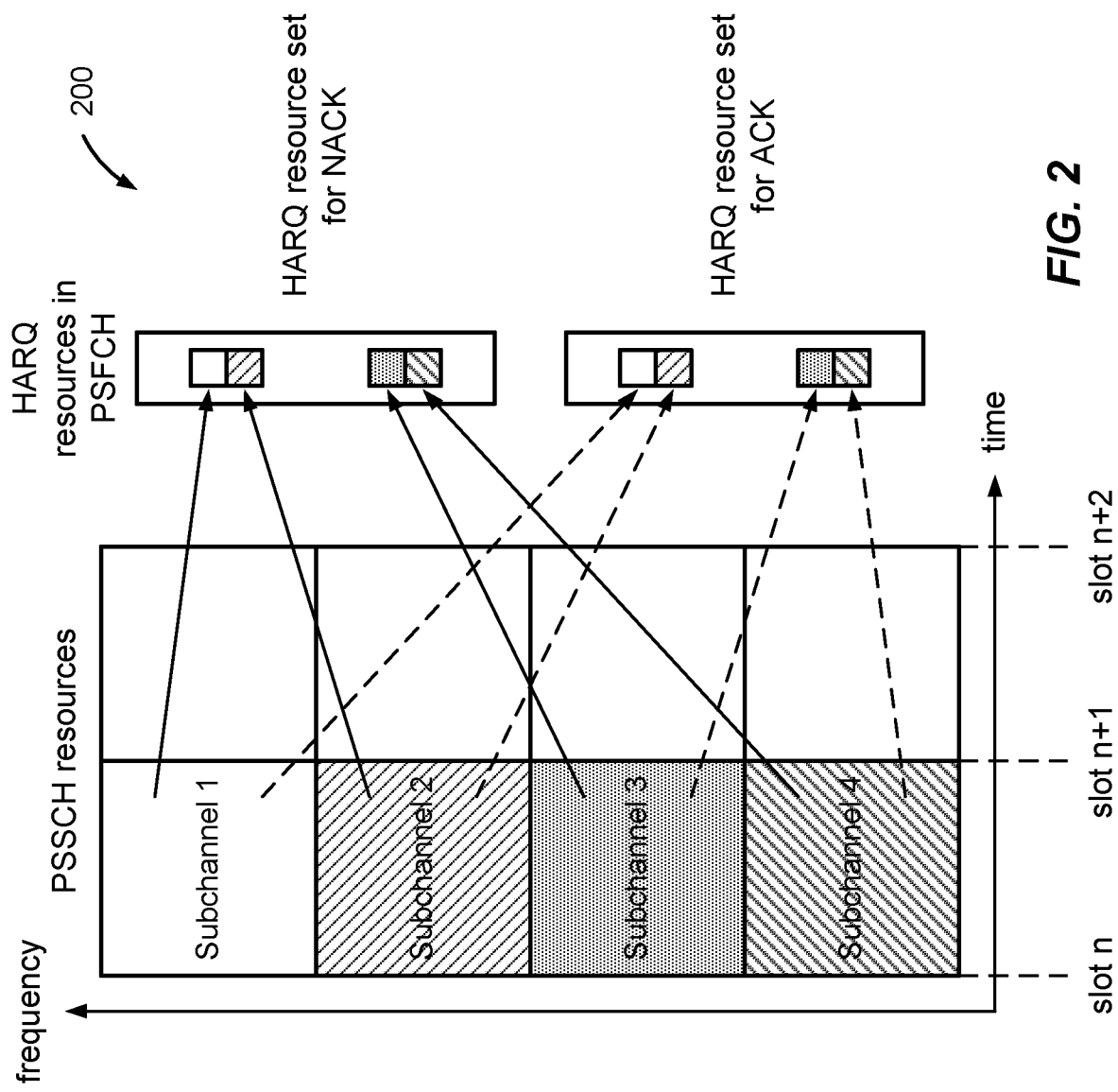
FIG. 2 illustrates an example of mapping subchannels of physical sidelink shared channel (PSSCH) to feedback resources of physical sidelink feedback channel (PSFCH)

In sidelink communications, there can be a mapping between PSCCH/PSSCH resources and feedback resources in PSFCH. FIG. 2 illustrates an example of mapping PSSCH subchannels to feedback resources in PSFCH. A subchannel may be viewed as a minimum unit for scheduling of resources (e.g., PSSCH) in the frequency domain, and may comprise a number of consecutive resource blocks (RBs) depending on configuration. Solid arrows in FIG. 1 show mapping examples between the subchannels and NACK resources in PSFCH, and dashed arrows show mapping examples between the subchannels and ACK resources. In the NACK only mode, there would be no need to define the mappings indicated with the dashed arrows.

Note that the ACK/NACK resources are not all contiguous. This implies that the target UE may be required to transmit feedback on multiple non-contiguous PSFCH resources. This can be disadvantageous since more power is typically required to transmit on non-contiguous frequency bands than on contiguous frequency bands. Perhaps even more significant, characteristics of the PSFCH feedback resources to be transmitted may exceed the target UE capabilities in some instances. For example, the target UE may not be able to transmit in non-contiguous bands, or may be limited in a number of non-contiguous bands for transmission. As another example, the number of feedback resources to be transmitted may simply exceed the target UE's capability.

In the ACK/NACK mode, this may not represent much of a problem since the originating UE is expected to retransmit in the absence of feedback from the target UE. That is, in the ACK/NACK mode, the originating UE treats no feedback much like receiving a NACK feedback.

However, in the NACK-only mode, exceeding the feedback capability of the target UE can be quite serious. In this mode, the target UE may not correctly receive a TB. Unfortunately, it may also not be able to send the NACK when it is not capable of doing so. But when the originating UE does not receive a feedback on a TB, the originating UE assumes that the target UE has successfully received transmitted TB, and moves on to the next TB. Thus, the target UE does not receive the needed retransmission.

To address some or all issues identified above, it is proposed that a target UE—more broadly, target apparatus—be able to indicate NACKs for multiple transmissions from one or more originating UEs—more broadly one or more originating apparatuses—with a multi-transmission NACK feedback, which is a single NACK feedback.

Figure 3:
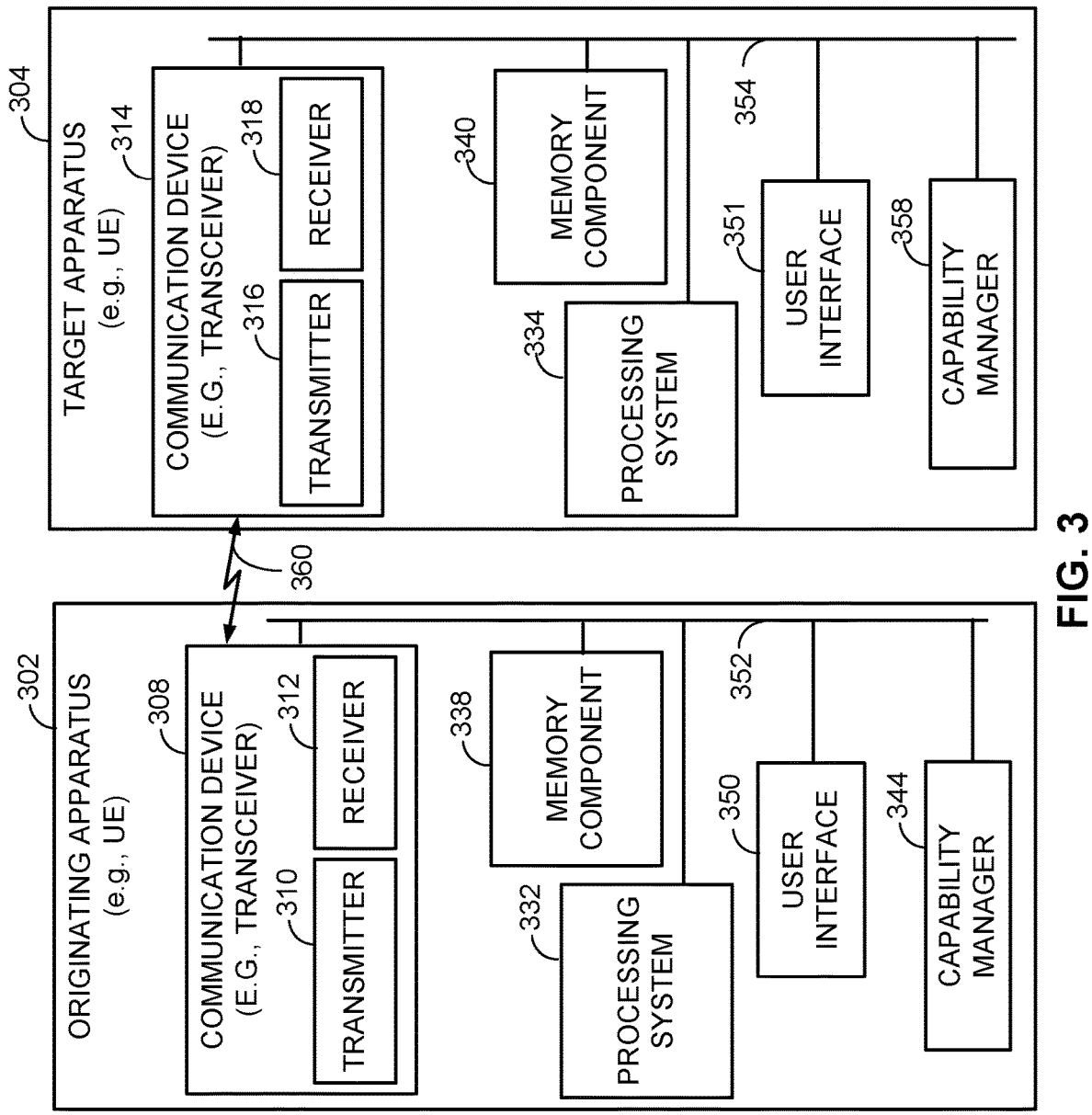
FIG. 3 illustrates a simplified block diagram of several sample aspects of components that may be employed in communication nodes, according to various aspects.

FIG. 3 illustrates several sample components (represented by corresponding blocks) that may be incorporated into an originating apparatus (e.g., a UE) and a target apparatus (e.g., another UE) that perform sidelink communications with each other. It should be recognized that in general, an apparatus may be an originating apparatus one moment and a target apparatus in another moment. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatuses 302, 304 each include at least one wireless communication device (represented by the communication devices 308 and 314) for communicating with other apparatuses via sidelink. For example, the communication devices 308 and 314 may communicate with each other over a wireless communication link 360. The communication device 308 may include at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Similarly, each communication device 314 may include at least one transmitter (represented by the transmitter 316) for transmitting signals (e.g., messages, indications, information, pilots, and so on) and at least one receiver (represented by the receiver 318) for receiving signals (e.g., messages, indications, information, and so on).

A transmitter and a receiver may comprise an integrated device (e.g., embodied as a transmitter circuit and a receiver circuit of a single communication device, generally referred to as a "transceiver") in some implementations, may comprise a separate transmitter device and a separate receiver device in some implementations, or may be embodied in other ways in other implementations.

The apparatuses 302, 304 may also include other components that can be used in sidelink communications as disclosed herein. The originating apparatus 302 may include a processing system 332 for providing functionality relating to, for example, the transmission originating operations as described herein and for providing other processing functionality. The apparatus 304 may include a processing system 334 for providing functionality relating to transmission receiving operations described herein and for providing other processing functionality. The apparatuses 302, 304, may include memory components 338, 340 (e.g., each including a memory device), e.g., for maintaining information (e.g., information indicative of reserved resources, thresholds, parameters, and so on). In addition, the apparatuses 302, 304 may include user interfaces 350, 351 for providing indications (e.g., audible and/or visual indications) to a user and/or for receiving user input (e.g., upon user actuation of a sensing device such a keypad, a touch screen, a microphone, and so on).

At the apparatuses 302, 304, the receivers 312, 318 may receive signals through their respective antenna(s). The receivers 312, 318 may recover information modulated onto RF carriers and provide the information to the processing systems 332, 334. The transmitters 310,316 and the receivers 312, 318 may implement Layer-1 functionalities associated with various signal processing functions.

The processing systems 332, 334 may provide RRC layer functionalities associated with system information (e.g., MIB, SIBs) transmission/acquisition, RRC connections, RLC layer functionalities, MAC layer functionalities, scheduling information reporting, error correction through hybrid automatic repeat request (HARM), and so on.

In an aspect, the apparatuses 302, 304 may include capability managers 344, 358. The capability managers 344, 358 may be hardware circuits that are part of or coupled to the processing systems 332, 334, that, when executed, cause the apparatuses 302 and 304 to perform the functionality described herein. Alternatively, the capability managers 344, 358 may be memory modules stored in the memory components 338, 340 that, when executed by the processing systems 332, 334, cause the apparatuses 302, 304 to perform the functionality described herein.

For convenience, the apparatuses 302, 304 are shown in FIG. 3 as including various components that may be configured according to the various examples described herein. It will be appreciated, however, that the illustrated blocks may have different functionality in different designs.

The various components of the apparatuses 302, 304 may communicate with each other over data buses 352, 354. The components of FIG. 3 may be implemented in various ways.

In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, 344, and 350 may be implemented by processor and memory component(s) of the originating apparatus 302 (e.g., by execution of appropriate code and/or by appropriate configuration of processor components). Similarly, some or all of the functionality represented by blocks 314, 320, 334, 340, and 358 may be implemented by processor and memory component(s) of the target apparatus 304 (e.g., by execution of appropriate code and/or by appropriate configuration of processor components). For simplicity, various operations, acts, and/or functions are described herein as being performed "by originating apparatus UE," "by target apparatus," etc. However, as will be appreciated, such operations, acts, and/or functions may actually be performed by specific components or combinations of components of the originating and target apparatuses, such as the processing systems 332, 334, the communication devices 308, 314, the capability managers 344, 358, etc.

As discussed above, it is proposed that a target apparatus be able to indicate NACKs for multiple transmissions from one or more originating apparatuses with a single feedback referred to as a multi-transmission NACK feedback. For example, a target apparatus (e.g., target apparatus 304) may be configured to provide one or more multi-transmission NACK feedbacks, in which each multi-transmission NACK feedback may be viewed as a single feedback that indicates NACKs on multiple transmissions from one or more originating apparatuses. As mentioned, this is less resource intensive than responding with individual NACKs for each unreceived transmission.

Figure 4:
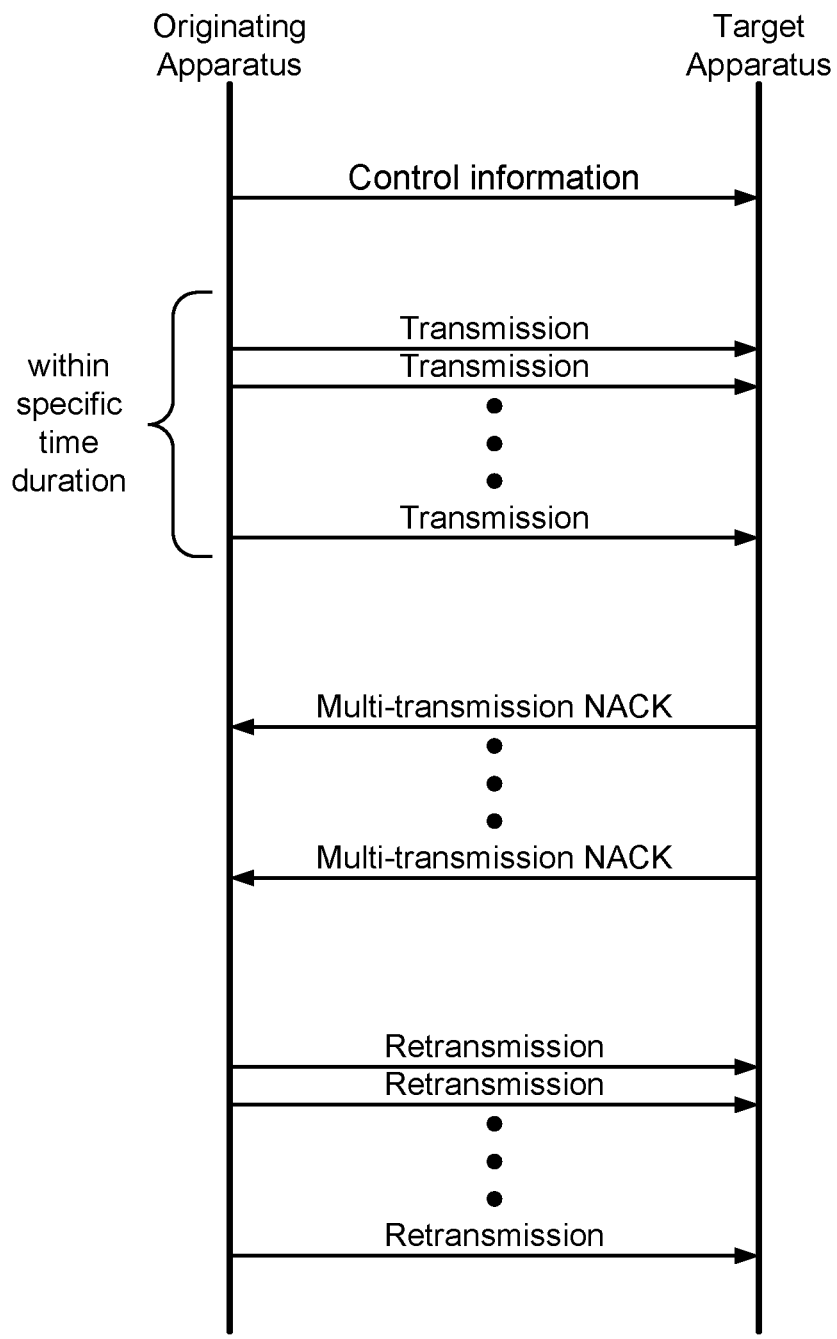
FIG. 4 illustrates an example signaling between originating and target apparatus to conduct sidelink communications when the apparatuses are operating in NACK-only mode, according to various aspects.

FIG. 4 illustrates an example signaling between originating and target apparatuses to conduct sidelink communications when the apparatuses are operating in NACK-only mode. Briefly, the originating apparatus may send control information to the target apparatus so that the target apparatus may prepare itself to receive transmissions. Thereafter, within some specific time duration (e.g., number of frames, subframes, slots, symbols, etc.), the originating apparatus may send a plurality of transmissions, and the target apparatus may listen for the plurality of transmissions. When the target apparatus fails to receive multiple transmission of the plurality of transmissions, the target apparatus may send one or more multi-transmission NACKs to the originating apparatus. In response to the multi-transmission NACKs, the originating apparatus may retransmit, in one or more subsequent time durations, the transmissions that were not successfully received.

Details are provided with respect to FIGS. 5 and 6, which respectively illustrate flowcharts of example methods 500 and 600 performed by originating and target apparatuses (e.g., originating apparatus 302, target apparatus 304) to perform sidelink communication with each other. The memory component 338 of the originating apparatus 302 may be an example of a computer-readable medium that stores computer executable instructions for one or more of the communication device 308 (including the transmitter 310 and/or the receiver 312), the processing system 334, the memory component 340, and/or the capability manager 344 of the originating apparatus 302 illustrated in FIG. 3 to perform the method 800. The memory component 340 of the target apparatus 304 may be an example of a computer-readable medium that stores computer executable instructions for one or more of the communication device 314 (including the transmitter 316 and/or the receiver 318), the processing system 334, the memory component 340, and/or the capability manager 358 of the target apparatus 304 illustrated in FIG. 3 to perform the method 900.

In FIGS. 5 and 6, dashed arrows indicate direction of communication flow between the originating and target apparatuses. While one originating apparatus and one target apparatus are shown, there can be one or more originating apparatuses and/or one or more target apparatuses (e.g., there can be unicast and/or multicast communications). But for convenience and ease of description, communication flow between one originating and one target apparatuses are described. Expanding the described concepts to multiple apparatuses should be relatively straightforward. At block 510, the originating apparatus may send control information, and at block 610, the target apparatus may receive the control information. Means to perform block 510 may include one or more of the communication device 308 (including the transmitter 310 and/or the receiver 312), the processing system 332, and/or the memory component 338 of the originating apparatus 302 illustrated in FIG. 3. Means to perform block 610 may include one or more of the communication device 314 (including the transmitter 316 and/or the receiver 318), the processing system 334, and/or the memory component 340 of the target apparatus 304 illustrated in FIG. 3.

The control information may include information indicating scheduling of resources of a data channel for carrying a plurality of transmissions from the originating apparatus and intended for the target apparatus. The control information may include scheduling information for transmissions that will occur within a specific time duration (e.g., see FIG. 4). The specific time duration may be specified as an amount of time or in units that correspond to time (e.g., number of frames, subframes, slots, symbols, etc.). The target apparatus may decode the received control information so that it may prepare itself to listen for transmissions intended for the target apparatus.

An example of the control information may be a sidelink control information (SCI) of 5G NR. The control information may be sent on a control channel (e.g., PSCCH). In another aspect, the control information may be sent on a data channel (e.g., PSSCH) in addition to the control channel. For example, the control information may be sent in two parts, one part on the control channel and another part on the data channel. In other words, the control information may be sent/received at least over the control channel.

At block 520, the originating apparatus may transmit a plurality of transmissions (e.g., a plurality of transport blocks (TBs)) on the data channel (e.g., PSSCH) within the specific time duration as scheduled. At block 620, the target apparatus may listen on the data channel based on the control information. For example, the target apparatus may listen on the scheduled resources (subchannels, slots, subframes, frames, resource blocks (RBs), etc.) of the data channel during the specific time duration for the plurality of transmissions.

Means to perform block 520 may include one or more of the communication device 308 (including the transmitter 310 and/or the receiver 312), the processing system 332, and/or the memory component 338 of the originating apparatus 302 illustrated in FIG. 3. Means to perform block 620 may include one or more of the communication device 314 (including the transmitter 316 and/or the receiver 318), the processing system 334, and/or the memory component 340 of the target apparatus 304 illustrated in FIG. 3.

If the target apparatus does not correctly receive multiples of the plurality of transmissions, at block 630, the target apparatus may send one or more multi-transmission NACKs to the originating apparatus on a feedback channel (e.g., PSFCH). At block 530, the originating apparatus may receive the multi-transmission NACKs. Means to perform block 630 may include one or more of the communication device 314 (including the transmitter 316 and/or the receiver 318), the processing system 334, and/or the memory component 340 of the target apparatus 304 illustrated in FIG. 3. Means to perform block 530 may include one or more of the communication device 308 (including the transmitter 310 and/or the receiver 312), the processing system 332, and/or the memory component 338 of the originating apparatus 302 illustrated in FIG. 3.

Each multi-transmission NACK may inform the originating apparatus that multiple transmissions of the plurality of transmissions during the time duration were not successfully received when listened for on the data channel in accordance with the control information. The multi-transmission NACKs may be carried on one or more resources of the feedback channel.

In an aspect, each multi-transmission NACK may correspond to a particular group of transmissions, in which each transmission of the group was either not received at all (e.g., not detected), or was received (e.g., detected) but the target apparatus was unable to correctly decode the received transmission. For ease of description, term "not successfully received" may be used to refer to transmissions that were not received at all or to transmissions that were not correctly decoded. It then may be said that each multi-transmission NACK may inform the originating apparatus that there is a corresponding group of transmissions that are not successfully received, also referred to as not-successfully-received group. Each not-successfully-received group may include multiple transmissions of the plurality of transmissions that are not successfully received at the target apparatus when listened for on the data channel. Each multi-transmission NACK may be a single feedback.

When there are two are more multi-transmission NACKs, the corresponding not-successfully-received groups may be different. In an aspect, two not-successfully-received groups may be considered to be different if at least one not-successfully-received transmission is a member of one group, but is not a member of the other group.

Normally, if the target apparatus is capable, it may NACK each not-successfully-received transmission individually. In many instances, this may be preferable since it would allow the originating apparatus to pinpoint more precisely which of the transmissions to retransmit. Thus, in one aspect, the target apparatus may send the one or more multi-transmission NACK when it determines that it cannot NACK individually for each not-successfully-received transmission. However, it is also contemplated that in some instances, the target apparatus may utilize the multi-transmission NACKs even though it may be capable of sending the individual NACKs.

Upon receiving the multi-transmission NACKs, at block 540, the originating apparatus may retransmit the not-successfully-received group to the target apparatus. At block 640, the target apparatus may listen for the retransmissions. Means to perform block 540 may include one or more of the communication device 308 (including the transmitter 310 and/or the receiver 312), the processing system 332, and/or the memory component 338 of the originating apparatus 302 illustrated in FIG. 3. Means to perform block 640 may include one or more of the communication device 314 (including the transmitter 316 and/or the receiver 318), the processing system 334, and/or the memory component 340 of the target apparatus 304 illustrated in FIG. 3.

It should be noted that the retransmissions may be parts of scheduled transmissions on subsequent one or more time durations. However, so as to minimize clutter, sending of control information from the originating apparatus and receiving of the same for the subsequent scheduling is not shown in FIGS. 4 and 5.

For each multi-transmission NACK, the originating apparatus may retransmit at least the multiple transmissions of the corresponding not-successfully-received group. In an aspect, a multi-transmission NACK may be one of a plurality of feedback cases in which each feedback case may indicate a common characteristic of the multiple transmissions of the corresponding not-successfully-received group. The originating apparatus may be able to determine which of the transmissions to retransmit based at least in part on the feedback case of each multi-transmission NACK. The following is a list (not necessarily exhaustive) of example feedback cases:

First feedback case may indicate that the multiple transmissions of the corresponding not-successfully-received group are transmissions carried on a particular subchannel;

Second feedback case may indicate that the multiple transmissions of the corresponding not-successfully-received group are transmissions transmitted at a particular time subdivision (e.g., frame, subframe, slot, etc.);

Third feedback case may indicate that the multiple transmissions of the corresponding not-successfully-received group are transmissions associated with a particular source ID. Note that different applications can configure different source IDs for the same UE;

Fourth feedback case may indicate that the multiple transmissions of the corresponding not-successfully-received group are transmissions associated with a particular destination ID. Note that different applications can configure different destination IDs for the same UE. A UE can also belong to different groups with each group being associated with a different ID;

Fifth feedback case may indicate that the multiple transmissions of the corresponding not-successfully-received group are transmissions associated with an originating ID uniquely identifying the originating apparatus;

Sixth feedback case may indicate that the multiple transmissions of the corresponding not-successfully-received group are transmissions associated with a particular originating group. A group in this case may be a group of UEs that can be addressed using a single groupcast (multicast) transmission instead of addressing each UE individually;

Seventh feedback case may indicate that the multiple transmissions of the corresponding not-successfully-received group are transmissions associated with a target ID uniquely identifying the target apparatus;

Eighth feedback case may indicate that the multiple transmissions of the corresponding not-successfully-received group are transmissions associated with a particular target group which is a group of receiving apparatuses that are intended recipients of the plurality of transmissions.

In an aspect, each multi-transmission NACK may be mapped to a feedback channel resource (e.g., to a resource block (RB) of PSFCH), and the target apparatus may send each multi-transmission NACK on the corresponding mapped feedback channel resource. The mapping may be based on a common characteristic of the multiple transmissions of the not-successfully-received group. With such feedback channel resource mapping, the originating apparatus can determine which of the plurality of transmissions to retransmit in future time durations when it receives the multi-transmission NACK.

Figure 7:
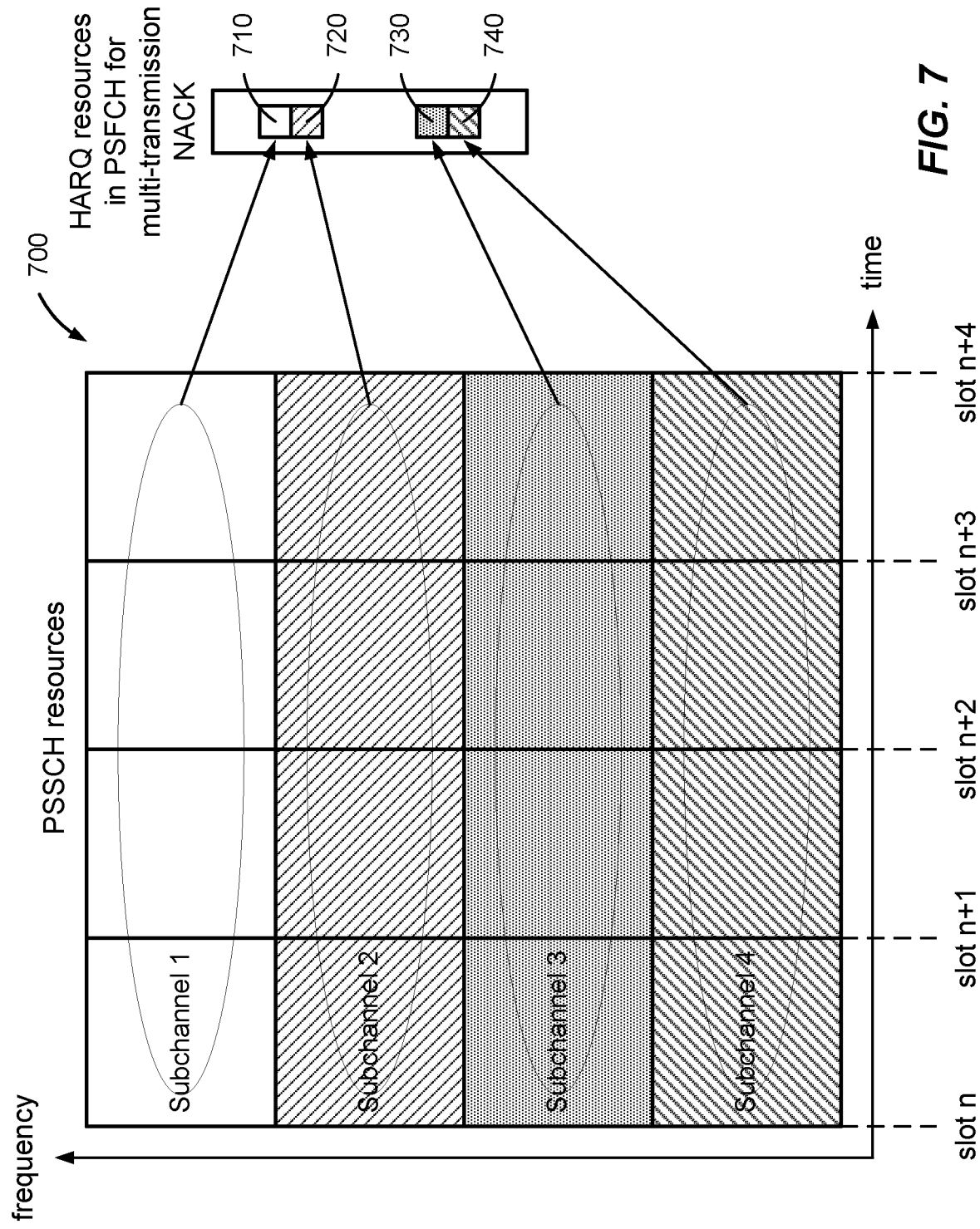
FIGS. 7-9 illustrate examples of mapping of multi-transmission NACKs to feedback channel resources, according to various aspects.

FIG. 7 illustrates an example in which multi-transmission NACKs are mapped to feedback channel resources based on subchannels identities (IDs). In resource map 700 of FIG. 7, subchannels 1, 2, 3 and 4 are illustrated to be mapped respectively to feedback channel resources 710, 720, 730 and 740. Thus, for example, if the target apparatus sends a multi-transmission NACK on feedback channel resource 710 at block 630, then the originating apparatus would recognize that the multiple transmission of the corresponding not-successfully-received group are transmissions that were transmitted on subchannel 1. The originating apparatus can then retransmit at block 540 the multiple transmissions of the corresponding not-successfully-received group, on the same subchannnel or on a different subchannel. While four subchannels are shown in FIG. 7, it should be noted that there can be any number of subchannels in a data channel.

Figure 8:
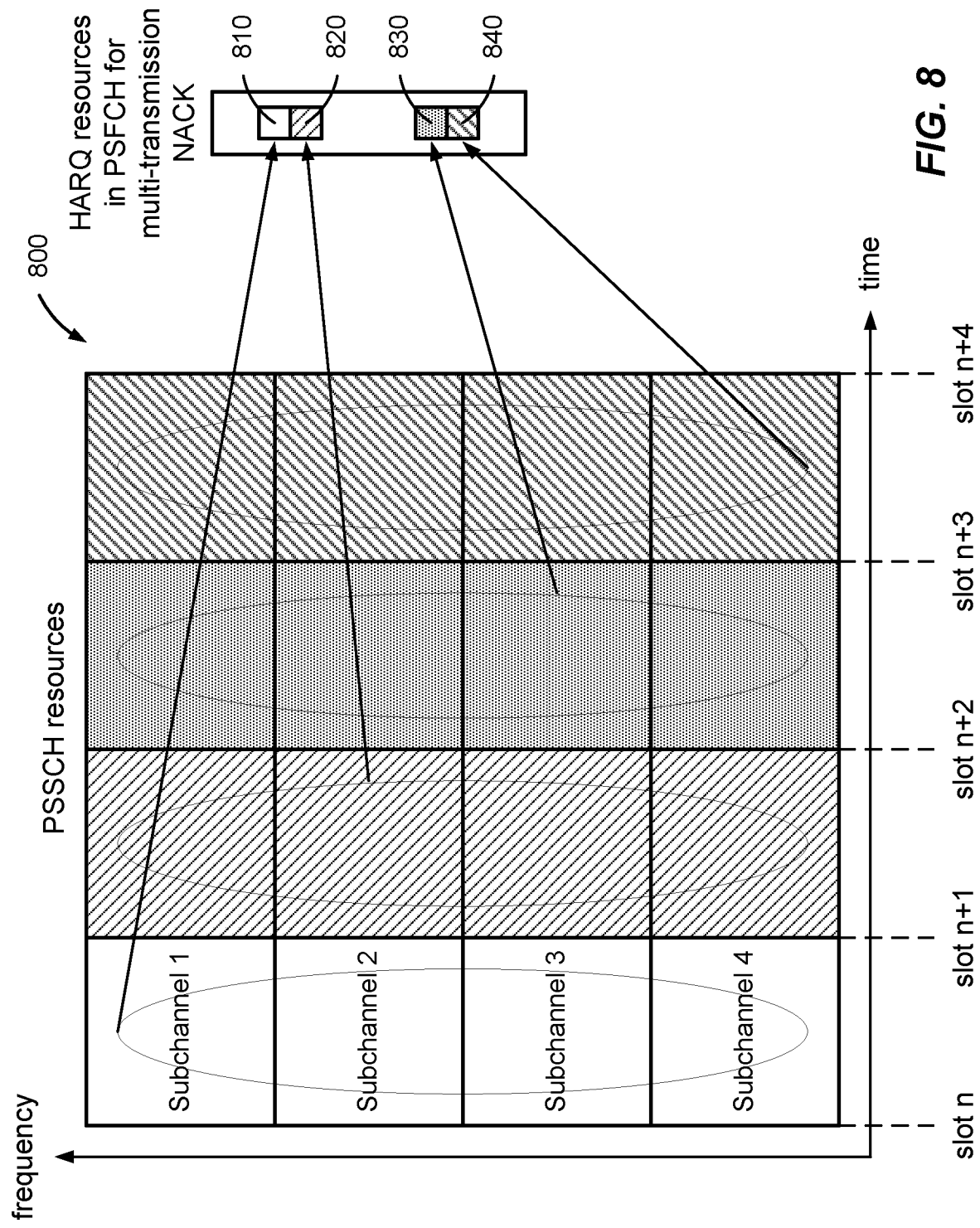

FIG. 8 illustrates another example in which multi-transmission NACKs are mapped to feedback channel resources. This time, the mappings are based on time subdivisions, e.g., slots. In resource map 800 of FIG. 8, time slots n, n+1, n+2 and n+3 are illustrated to be mapped respectively to feedback channel resources 810, 820, 830 and 840. Thus, for example, if the target apparatus sends a multi-transmission NACK on feedback channel resource 810, then the originating apparatus would recognize that the multiple transmission of the corresponding not-successfully-received group are transmissions that were transmitted on time slot n. The originating apparatus can then retransmit the multiple transmissions of the corresponding not-successfully-received group, in the same time slot, or in different time slots. While four time slots are shown in FIG. 8, it should be noted that there can be any number of time slots in a data channel. Moreover, other time subdivisions may used for mapping, e.g., frames, subframes, slots, etc.

While not illustrated, other common characteristics may be used for resource mapping purposes. These include source IDs, destination IDs, originating IDs, originating groups, target IDs, and/or target groups. Each multi-transmission NACK may be mapped based on any combination of the common characteristics.

Figure 9:
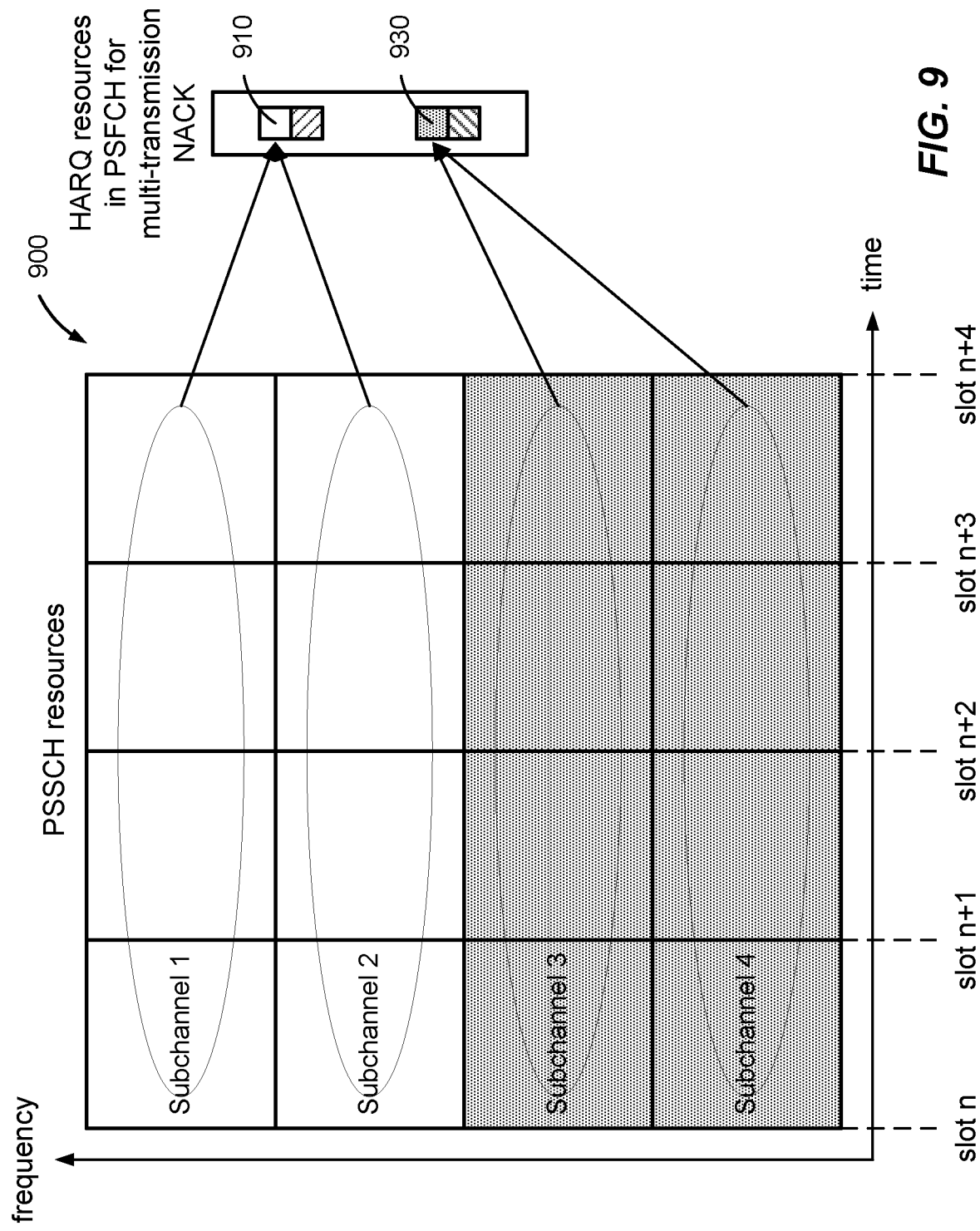

In an aspect, one or more of the multi-transmission NACKs may be mapped one-to-one with the feedback channel resources. FIGS. 7 and 8 are examples of such one-to-one mappings. But in another aspect, two or more multi-transmission NACKs can be mapped to the same feedback channel resource as illustrated in FIG. 9. Similar to FIG. 7, FIG. 9 illustrates an example in which multi-transmission NACKs are mapped to feedback channel resources based on the subchannels. But unlike FIG. 7, in resource map 900 of FIG. 9, multiple multi-transmission NACKs are mapped to a same channel feedback resource. For example, subchannels 1 and 2 are mapped to feedback channel resource 910, and subchannels 3 and 4 are mapped to feedback channel resource 930. In this instance, if the originating apparatus receives a multi-transmission NACK on channel feedback resource 910 at block 530, it may retransmit all transmissions transmitted on subchannels 1 and 2 at block 540.

But in another aspect, even when multiple multi-transmission NACKs are mapped to the same feedback channel resource, the target apparatus may be able to indicate the specific multi-transmission NACK through sequence properties. For assume that the target apparatus wishes to indicate that multi-transmission NACK corresponds to subchannel 1, i.e., to indicate that multiple transmissions transmitted on subchannel 1 were not successfully received. To differentiate between subchannel 1 and subchannel 2, when sending the multi-transmission NACK at block 630, the target apparatus may sequence the multi-transmission NACK carried on the feedback channel resource 910 one way for subchannel 1 and a different way for subchannel 2. The originating apparatus may more precisely determine what transmissions to retransmit based on the sequence of the multi-transmission NACK in addition to the feedback resource mapping.

It is recognized that there can be multiple originating apparatus and/or multiple target apparatuses. This means that from the perspective of one target apparatus, a multi-transmission NACK may be mapped to a feedback channel resource that is shared by one or more other target apparatuses. In such instances, the target apparatus may generate a sequence of the multi-transmission NACK differently from the sequence of the multi-transmission NACK generated by the other target apparatuses. This can enable the originating apparatus to identify the correct target apparatus for retransmission.

Note that the target apparatus may generate same or different sequences for each of the multi-transmission NACKs, regardless of whether or not the mapped resource is shared. For example, the sequence may be generated based on any combination of the subchannel ID, time subdivision ID (e.g., frame ID, subframe ID, slot ID, etc.), source ID, destination ID, originating group ID, target ID, and/or target group ID.

The following provides an overview of examples of the present disclosure:

Example 1: A method of a target apparatus, comprising: receiving control information from one or more originating apparatuses, the control information indicating scheduling of resources of a data channel for carrying a plurality of transmissions from the one or more originating apparatuses and intended for the target apparatus; listening on the data channel for the plurality of transmissions based on the control information; and sending a multi-transmission negative acknowledgment (NACK) to the one or more originating apparatuses on a feedback channel to inform the one or more originating apparatuses that there is a not-successfully-received group of transmissions, the not-successfully-received group comprising multiple transmissions of the plurality of transmissions that were not successfully received at the target apparatus when listened for on the data channel, and the multi-transmission NACK being a single feedback.

Example 2: The method of example 1, wherein the control information is received at least over a physical sidelink control channel (PSCCH), the data channel is a physical sidelink shared channel (PSSCH), and the feedback channel is a physical sidelink feedback channel (PSFCH).

Example 3: The method of any of examples 1 through 2, further comprising: determining whether the target apparatus is or is not capable of sending an individual NACK for each transmission of the not-successfully-received group, and wherein the multi-transmission NACK is sent when it is determined that the target apparatus is not capable of sending the individual NACK for each transmission of the not-successfully-received group.

Example 4: The method of any of examples 1 through 3, wherein the multi-transmission NACK is applicable to the plurality of transmissions scheduled to be carried on the data channel within a specific time duration.

Example 5: The method of example 4, wherein the specific time duration is a number of frames, a number of subframes, or a number of slots.

Example 6: The method of any of examples 4 through 5, wherein the multi-transmission NACK is one or more of a plurality of feedback cases, each feedback case indicating a common characteristic of the multiple transmissions of the not-successfully-received group.

Example 7: The method of example 6, wherein the plurality of feedback cases includes: a first feedback case indicating that the multiple transmissions of the not-successfully-received group are transmissions carried on a particular subchannel of the data channel, a second feedback case indicating that the multiple transmissions of the not-successfully-received group are transmissions transmitted at a particular time subdivision, a third feedback case indicating that the multiple transmissions of the not-successfully-received group are transmissions associated with a particular source identity (ID), a fourth feedback case indicating that the multiple transmissions of the not-successfully-received group are transmissions associated with a particular destination ID, a fifth feedback case indicating that the multiple transmissions of the not-successfully-received group are transmissions associated with an originating ID uniquely identifying the one or more originating apparatuses, a sixth feedback case indicating that the multiple transmissions of the not-successfully-received group are transmissions associated with a particular originating group, a seventh feedback case indicating that the multiple transmissions of the not-successfully-received group are transmissions associated with a target ID uniquely identifying the target apparatus, and an eighth feedback case indicating that the multiple transmissions of the not-successfully-received group are transmissions associated with a particular target group which is a group of receiving apparatuses that are intended recipients of the plurality of transmissions.

Example 8: The method of any of examples 1 through 7, wherein the multi-transmission NACK is mapped to a feedback channel resource based on a common characteristic of the multiple transmissions of the not-successfully-received group, and wherein the multi-transmission NACK is sent on the feedback channel resource mapped to the multi-transmission NACK.

Example 9: The method of example 8, wherein the common characteristic is any one or more of: a particular subchannel, a particular time subdivision, a particular source ID, a particular destination ID, a particular originating ID, a particular originating group, a particular target ID, and/or a particular target group.

Example 10: The method of any of examples 8 through 9, wherein the multi-transmission NACK and another multi-transmission NACK are mapped to a same feedback channel resource.

Example 11: The method of any of examples 8 through 10, further comprising generating a sequence of the multi-transmission NACK that is different from a sequence generated for the another multi-transmission NACK.

Example 12: The method of any of examples 1 through 11, wherein the multi-transmission NACK is sent on a feedback channel resource that is shared with one or more other target apparatuses.

Example 13: The method of example 12, further comprising generating a sequence of the multi-transmission NACK that is different from a sequence of the multi-transmission NACK generated by at least one of the one or more other target apparatuses.

Example 14: The method of any of examples 12 through 13, further comprising generating a sequence of the multi-transmission NACK based on a source identity (ID) and/or a destination ID provided in the control information.

Example 15: A method of an originating apparatus, comprising: sending control information to a target apparatus, the control information indicating scheduling of resources of a data channel for carrying a plurality of transmissions from the originating apparatus and intended for the target apparatus; transmitting on the data channel the plurality of transmissions; receiving a multi-transmission negative acknowledgment (NACK) from the target apparatus on a feedback channel, the multi-transmission NACK informing the originating apparatus that there is a not-successfully-received group of transmissions, the not-successfully-received group comprising multiple transmissions of the plurality of transmissions that were not successfully received at the target apparatus when listened for on the data channel, and the multi-transmission NACK being a single feedback; and retransmitting at least the multiple transmissions of the not-successfully-received group on the data channel when the multi-transmission NACK is received.

Example 16: The method of example 15, wherein the control information is received at least over a physical sidelink control channel (PSCCH), the data channel is a physical sidelink shared channel (PSSCH), and the feedback channel is a physical sidelink feedback channel (PSFCH).

Example 17: The method of any of examples 15 through 16, wherein the multi-transmission NACK is applicable to the plurality of transmissions scheduled to be carried on the data channel within a specific time duration.

Example 18: The method of example 17, wherein the specific time duration is a number of frames, a number of subframes, or a number of slots.

Example 19: The method of any of examples 17 through 18, wherein the multi-transmission NACK is one or more of a plurality of feedback cases, each feedback case indicating a common characteristic of the multiple transmissions of the not-successfully-received group, and wherein the method further comprises determining which of the plurality of transmissions to retransmit based on the feedback case of the multi-transmission NACK.

Example 20: The method of example 19, wherein the plurality of feedback cases includes: a first feedback case indicating that the multiple transmissions of the not-successfully-received group are transmissions carried on a particular subchannel of the data channel, a second feedback case indicating that the multiple transmissions of the not-successfully-received group are transmissions transmitted at a particular time subdivision, a third feedback case indicating that the multiple transmissions of the not-successfully-received group are transmissions associated with a particular source identity (ID), a fourth feedback case indicating that the multiple transmissions of the not-successfully-received group are transmissions associated with a particular destination ID, a fifth feedback case indicating that the multiple transmissions of the not-successfully-received group are transmissions associated with an originating ID uniquely identifying the one or more originating apparatuses, a sixth feedback case indicating that the multiple transmissions of the not-successfully-received group are transmissions associated with a particular originating group, a seventh feedback case indicating that the multiple transmissions of the not-successfully-received group are transmissions associated with a target ID uniquely identifying the target apparatus, and an eighth feedback case indicating that the multiple transmissions of the not-successfully-received group are transmissions associated with a particular target group which is a group of receiving apparatuses that are intended recipients of the plurality of transmissions.

Example 21: The method of any of examples 15 through 20, wherein the multi-transmission NACK is mapped to a feedback channel resource based on a common characteristic of the multiple transmissions of the not-successfully-received group, and wherein the method further comprises determining which of the plurality of transmissions to retransmit based on the feedback channel resource used to carry the multi-transmission NACK.

Example 22: The method of example 21, wherein the common characteristic is any one or more of: a particular subchannel, a particular time subdivision, a particular source ID, a particular destination ID, a particular originating ID, a particular originating group, a particular target ID, and/or a particular target group.

Example 23: The method of any of examples 21 through 22, wherein the multi-transmission NACK and another multi-transmission NACK are mapped to a same feedback channel resource.

Example 24: The method of example 23, wherein the method further comprises determining which of the plurality of transmissions to retransmit based on a sequence of the multi-transmission NACK.

Example 25: The method of any of examples 15 through 24, wherein the multi-transmission NACK is received on a feedback channel resource that is shared by the target apparatus and one or more other target apparatuses.

Example 26: The method of example 25, wherein the method further comprises identifying the target apparatus for retransmission based on a sequence of the multi-transmission NACK.

Example 27: The method of any of examples 25 through 26, wherein the method further comprises: identifying a source ID and/or a destination ID of the multiple messages of the not-successfully-received group based on a sequence of the multi-transmission NACK; and determining which of the plurality of transmissions to retransmit based on the source ID and/or the destination ID.

Example 28: A target apparatus comprising a processor communicatively coupled with a memory and a transceiver, wherein the processor, the memory, and or the transceiver are configured to perform a method of any of examples 1 through 14.

Example 29: An originating apparatus comprising a processor communicatively coupled with a memory and a transceiver, wherein the processor, the memory, and or the transceiver are configured to perform a method of any of examples 15 through 27.

Example 30: A target apparatus comprising at least one means for performing a method of any of examples 1 through 14.

Example 31: An originating apparatus comprising at least one means for performing a method of any of examples 15 through 27.

Example 32: A non-transitory computer-readable medium storing code for a target apparatus comprising a processor communicatively coupled with a memory and a transceiver, and instructions stored in the memory and executable by the processor to cause the target apparatus to perform a method of any of examples 1 through 14.

Example 33: A non-transitory computer-readable medium storing code for an originating apparatus comprising a processor communicatively coupled with a memory and a transceiver, and instructions stored in the memory and executable by the processor to cause the target apparatus to perform a method of any of examples 15 through 27.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a CD-ROM, or any other form of non-transitory computer-readable medium known in the art. An exemplary non-transitory computer-readable medium may be communicatively coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a Compact Disk (CD), laser disc, optical disk, Digital Video Disk (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A target apparatus, comprising:
 a transceiver;
 a memory; and
 a processor communicatively coupled to the transceiver and the memory,
 wherein the processor, the transceiver, and/or the memory are configured to:
  receive control information from one or more originating apparatuses, the control information indicating scheduling of resources of a data channel for carrying a plurality of transmissions from the one or more originating apparatuses and intended for the target apparatus;
  listen on the data channel for the plurality of transmissions based on the control information; and
  send a multi-transmission negative acknowledgment (NACK) in a NACK-only mode to multiple originating apparatuses on a feedback channel to inform the multiple originating apparatuses that there is a not-successfully-received group of transmissions, the not-successfully-received group comprising multiple transmissions of the plurality of transmissions that were not successfully received at the target apparatus when listened for on the data channel, and the multi-transmission NACK being a single feedback, wherein the multiple transmissions of the not-successfully-received group are carried on a particular subchannel of the data channel and the subchannel is a minimum unit for scheduling a physical sidelink shared channel (PSSCH).

2. The target apparatus of claim 1, wherein the control information is received at least over a physical sidelink control channel (PSCCH), the data channel is a physical sidelink shared channel (PSSCH), and the feedback channel is a physical sidelink feedback channel (PSFCH).

3. The target apparatus of claim 1,
wherein the processor, the transceiver, and/or the memory are further configured to determine whether the target apparatus is or is not capable of sending an individual NACK for each transmission of the not-successfully-received group, and
wherein the processor, the transceiver, and/or the memory are configured to send the multi-transmission NACK when it is determined that the target apparatus is not capable of sending the individual NACK for each transmission of the not-successfully-received group.

4. The target apparatus of claim 1, wherein the multi-transmission NACK is applicable to the plurality of transmissions scheduled to be carried on the data channel within a specific time duration.

5. The target apparatus of claim 4, wherein the specific time duration is a number of frames, a number of subframes, or a number of slots.

6. The target apparatus of claim 4, wherein the multi-transmission NACK is one or more of a plurality of feedback cases, each feedback case indicating a common characteristic of the multiple transmissions of the not-successfully-received group.

7. The target apparatus of claim 6, wherein the plurality of feedback cases includes:
a second feedback case indicating that the multiple transmissions of the not-successfully-received group are transmissions transmitted at a particular time subdivision,
a third feedback case indicating that the multiple transmissions of the not-successfully-received group are transmissions associated with a particular source identity (ID),
a fourth feedback case indicating that the multiple transmissions of the not-successfully-received group are transmissions associated with a particular destination ID,
a fifth feedback case indicating that the multiple transmissions of the not-successfully-received group are transmissions associated with an originating ID uniquely identifying the one or more originating apparatuses,
a sixth feedback case indicating that the multiple transmissions of the not-successfully-received group are transmissions associated with a particular originating group,
a seventh feedback case indicating that the multiple transmissions of the not-successfully-received group are transmissions associated with a target ID uniquely identifying the target apparatus, and
an eighth feedback case indicating that the multiple transmissions of the not-successfully-received group are transmissions associated with a particular target group which is a group of receiving apparatuses that are intended recipients of the plurality of transmissions.

8. The target apparatus of claim 1,
wherein the multi-transmission NACK is mapped to a feedback channel resource based on a common characteristic of the multiple transmissions of the not-successfully-received group, and
wherein the processor, the transceiver, and/or the memory are configured to send the multi-transmission NACK on the feedback channel resource mapped to the multi-transmission NACK.

9. The target apparatus of claim 8, wherein the common characteristic is any one or more of:
a particular subchannel, a particular time subdivision, a particular source ID, a particular destination ID, a particular originating ID, a particular originating group, a particular target ID, and/or a particular target group.

10. The target apparatus of claim 8, wherein the multi-transmission NACK and another multi-transmission NACK are mapped to a same feedback channel resource.

11. The target apparatus of claim 10, wherein the processor, the transceiver, and/or the memory are configured to generate a sequence of the multi-transmission NACK that is different from a sequence generated for the another multi-transmission NACK.

12. The target apparatus of claim 1, wherein the multi-transmission NACK is sent on a feedback channel resource that is shared with one or more other target apparatuses.

13. The target apparatus of claim 12, wherein the processor, the transceiver, and/or the memory are configured to generate a sequence of the multi-transmission NACK that is different from a sequence of the multi-transmission NACK generated by at least one of the one or more other target apparatuses.

14. The target apparatus of claim 12, wherein the processor, the transceiver, and/or the memory are configured to generate a sequence of the multi-transmission NACK based on a source identity (ID) and/or a destination ID provided in the control information.

15. An originating apparatus, comprising:
a transceiver;
a memory; and
a processor communicatively coupled to the transceiver and the memory,
wherein the processor, the transceiver, and/or the memory are configured to:
send control information to a target apparatus, the control information indicating scheduling of resources of a data channel for carrying a plurality of transmissions from the originating apparatus and intended for the target apparatus;
transmit on the data channel the plurality of transmissions;
receive in a NACK-only mode a multi-transmission negative acknowledgment (NACK) from the target apparatus on a feedback channel, the multi-transmission NACK informing the originating apparatus that there is a not-successfully-received group of transmissions, the not-successfully-received group comprising multiple transmissions of the plurality of transmissions that were not successfully received at the target apparatus when listened for on the data channel, and the multi-transmission NACK being a single feedback, wherein the multiple transmissions of the not-successfully-received group are carried on a particular subchannel of the data channel and the subchannel is a minimum unit for scheduling a physical sidelink shared channel (PSSCH); and retransmit at least the multiple transmissions of the not-successfully-received group at the particular subchannel of the data channel when the multi-transmission NACK is received.

16. The originating apparatus of claim 15, wherein the control information is received at least over a physical sidelink control channel (PSCCH), the data channel is a physical sidelink shared channel (PSSCH), and the feedback channel is a physical sidelink feedback channel (PSFCH).

17. The originating apparatus of claim 15, wherein the multi-transmission NACK is applicable to the plurality of transmissions scheduled to be carried on the data channel within a specific time duration.

18. The originating apparatus of claim 17, wherein the specific time duration is a number of frames, a number of subframes, or a number of slots.

19. The originating apparatus of claim 17,
wherein the multi-transmission NACK is one or more of a plurality of feedback cases, each feedback case indicating a common characteristic of the multiple transmissions of the not-successfully-received group, and
wherein the processor, the transceiver, and/or the memory are configured to determine which of the plurality of transmissions to retransmit based on the feedback case of the multi-transmission NACK.

20. The originating apparatus of claim 19, wherein the plurality of feedback cases includes:
a second feedback case indicating that the multiple transmissions of the not-successfully-received group are transmissions transmitted at a particular time subdivision,
a third feedback case indicating that the multiple transmissions of the not-successfully-received group are transmissions associated with a particular source identity (ID),
a fourth feedback case indicating that the multiple transmissions of the not-successfully-received group are transmissions associated with a particular destination ID,
a fifth feedback case indicating that the multiple transmissions of the not-successfully-received group are transmissions associated with an originating ID uniquely identifying the originating apparatus,
a sixth feedback case indicating that the multiple transmissions of the not-successfully-received group are transmissions associated with a particular originating group,
a seventh feedback case indicating that the multiple transmissions of the not-successfully-received group are transmissions associated with a target ID uniquely identifying the target apparatus, and
an eighth feedback case indicating that the multiple transmissions of the not-successfully-received group are transmissions associated with a particular target group which is a group of receiving apparatuses that are intended recipients of the plurality of transmissions.

21. The originating apparatus of claim 15,
wherein the multi-transmission NACK is mapped to a feedback channel resource based on a common characteristic of the multiple transmissions of the not-successfully-received group, and wherein the processor, the transceiver, and/or the memory are configured to determine which of the plurality of transmissions to retransmit based on the feedback channel resource used to carry the multi-transmission NACK.

22. The originating apparatus of claim 21, wherein the common characteristic is any one or more of:
a particular subchannel, a particular time subdivision, a particular source ID, a particular destination ID, a particular originating ID, a particular originating group, a particular target ID, and/or a particular target group.

23. The originating apparatus of claim 21, wherein the multi-transmission NACK and another multi-transmission NACK are mapped to a same feedback channel resource.

24. The originating apparatus of claim 23, wherein the processor, the transceiver, and/or the memory are configured to determine which of the plurality of transmissions to retransmit based further on a sequence of the multi-transmission NACK.

25. The originating apparatus of claim 15, wherein the multi-transmission NACK is received on a feedback channel resource that is shared by the target apparatus and one or more other target apparatuses.

26. The originating apparatus of claim 25, wherein the processor, the transceiver, and/or the memory are configured to identify the target apparatus for retransmission based on a sequence of the multi-transmission NACK.

27. The originating apparatus of claim 25, wherein the processor, the transceiver, and/or the memory are configured to:
identify a source ID and/or a destination ID of the multiple messages of the not-successfully-received group based on a sequence of the multi-transmission NACK; and
determine which of the plurality of transmissions to retransmit based on the source ID and/or the destination ID.

28. A method of a target apparatus, the method comprising:
receiving control information from one or more originating apparatuses, the control information indicating scheduling of resources of a data channel for carrying a plurality of transmissions from the one or more originating apparatuses and intended for the target apparatus;
listening on the data channel for the plurality of transmissions based on the control information; and
sending a multi-transmission negative acknowledgment (NACK) in a NACK-only mode to multiple originating apparatuses on a feedback channel to inform the multiple originating apparatuses that there is a not successfully-received group of transmissions, the not-successfully-received group comprising multiple transmissions of the plurality of transmissions that were not successfully received at the target apparatus when listened for on the data channel, and the multi-transmission NACK being a single feedback, wherein the multiple transmissions of the not-successfully-received group are transmitted at a particular subchannel of the data channel and the subchannel is a minimum unit for scheduling a physical sidelink shared channel (PSSCH).

29. The method of claim 28,
wherein the multi-transmission NACK is mapped to a feedback channel resource based on a common characteristic of the multiple transmissions of the not-successfully-received group, and wherein sending the multi-transmission NACK comprises sending the multi-transmission NACK on the feedback channel resource mapped to the multi-transmission NACK.

30. A method of an originating apparatus, the method comprising:
   sending control information to a target apparatus, the control information indicating scheduling of resources of a data channel for carrying a plurality of transmissions from the originating apparatus and intended for the target apparatus;
   transmitting on the data channel the plurality of transmissions;
   receiving in a NACK-only mode a multi-transmission negative acknowledgment (NACK) from the target apparatus on a feedback channel, the multi-transmission NACK informing the originating apparatus that there is a not successfully-received group of transmissions, the not-successfully-received group comprising multiple transmissions of the plurality of transmissions that were not successfully received at the target apparatus when listened for on the data channel, and the multi-transmission NACK being a single feedback, wherein the multiple transmissions of the not-successfully-received group are transmitted at a particular subchannel of the data channel and the subchannel is a minimum unit for scheduling a physical sidelink shared channel (PSSCH); and
   retransmitting at least the multiple transmissions of the not-successfully-received group at the particular subchannel of the data channel when the multi-transmission NACK is received.

* * * * *